United States Patent [19]

Bauld et al.

[11] Patent Number: 4,552,928
[45] Date of Patent: Nov. 12, 1985

[54] DI- AND TRIPHENYLATED CATION RADICAL POLYMERS AND THEIR USE AS DIELS-ALDER CATALYSTS

[75] Inventors: Nathan L. Bauld; Dennis J. Bellville, both of Austin, Tex.

[73] Assignee: Board of Regents, The University of Texas System, Austin, Tex.

[21] Appl. No.: 651,059

[22] Filed: Sep. 17, 1984

Related U.S. Application Data

[63] Continuation of Ser. No. 317,109, Nov. 2, 1981, Pat. No. 4,503,195.

[51] Int. Cl.[4] .................................................. C08F 8/44
[52] U.S. Cl. ............................ 525/326.2; 525/331.5; 525/333.1; 525/333.3; 525/333.4; 525/333.6; 525/333.7; 525/340; 525/359.1; 525/379; 525/452; 525/534; 536/30; 536/56; 536/101
[58] Field of Search ................ 525/333.4, 333.6, 340, 525/359.1, 379, 326.2, 333.1, 331.5, 333.7, 452, 534; 536/30, 56, 101

[56] References Cited

U.S. PATENT DOCUMENTS

| | | |
|---|---|---|
| 3,737,474 | 6/1973 | Dunn . |
| 3,793,354 | 2/1974 | Schwager et al. ............. 260/429 R |
| 3,960,962 | 6/1976 | Shubkin . |
| 4,098,727 | 7/1978 | Haag et al. ........................... 521/53 |
| 4,137,386 | 1/1979 | Smith .............................. 525/359.1 |
| 4,179,403 | 12/1979 | Kim et al. ........................... 252/431 |
| 4,198,353 | 4/1980 | Carlock .............................. 260/604 |
| 4,228,035 | 10/1980 | Gray et al. .......................... 252/431 |
| 4,238,358 | 12/1980 | Holy et al. ....................... 252/431 C |

OTHER PUBLICATIONS

Rembaum, et al., *J. Polym.-Sci.* (Polymer Symposia) 4C:529–549 (1963).
Rembaum, et al., *J. Macromol. Chem.* 1: 673–691 (1966).
Stewart, et al., *J. Macromol. Sci.-Chem.* 1A: 1143–1153 (1967).
Schutte, et al., *J. Am. Chem. Soc.* 91: 3715–3720 (1969).
Penner, et al., *J. Am. Chem. Soc.* 92: 2861–2867 (1970).
Avny, et al., *Eur. Polym. Jr.* 7:1037–1046 (1971).
Ledwith, A. *Accounts Chem. Research* 5: 133–139 (1972).
Barton, et al., *J. Chem. Soc. Perkin Trans. I*, 2055–2065 (1975).
Lang, et al., *J. Am. Chem. Soc.* 100: 5248–5249 (1978).
Bellville, et al., *J. Am. Chem. Soc.*, 103: 718–720 (1981).

*Primary Examiner*—Joseph L. Schofer
*Assistant Examiner*—Bernard Lipman
*Attorney, Agent, or Firm*—Arnold, White & Durkee

[57] ABSTRACT

A regenerative catalyst composition is provided comprising polymer supported covalently bound di- or triphenylated cation radical salts, wherein the cation radical is a Group VA element and the complementing anion is a Lewis acid anion or other anion, such as perhalo acid or acid metal halide. The phenylated cation radical salts, either polymer supported or unsupported, are useful catalytic agents facilitating the versatile Diels-Alder organic synthetic reactions to form cyclohexene compounds including the more intricate terpenoids, steroids, alkaloids, and prostaglandinoids.

9 Claims, 4 Drawing Figures

DI- AND TRIPHENYLATED CATION RADICAL POLYMERS AND THEIR USE AS DIELS-ALDER CATALYSTS

This is a continuation application of Ser. No. 317,109, filed Nov. 2, 1981, now issued as U.S. Pat. No. 4,503,195, on Mar. 5, 1985.

BACKGROUND OF THE INVENTION

The present invention relates generally to catalyst compositions and processes for making and using the same; and more particularly, it relates to the formation of polymer supported or unsupported di- and triphenylated cation radicals useful for cation radical catalyzed Diels-Alder reactions.

Most of the catalyst reagents available to ionize organic molecules are extremely powerful oxidants which possess alternate reactivity modes with the organic molecule substrates. An exception to the conventional ionizing reagents which induce severe oxidation is the tris-(p-bromo-phenyl) aminium hexachloroantimonate reagent (TBPA), which is a clean one electron oxidizing agent, having the following structure:

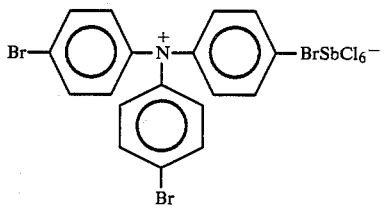

Despite TBPA's selective oxidation capabilities, this reagent has not met with commercial success for industrial use as a cation ion radical catalyst. Factors which have suppressed widespread implementation of this catalyst reagent include the costly and inefficient synthesis of the catalyst reagent, its short shelf-life, the undesirable residue of difficult to remove amines upon use of the catalyst to generate cation radicals, and the difficulty presented in recovering the spent catalyst from the reaction product mixture.

The present invention envisions the attachment of an aminium function similar to TBPA to an insoluble polymer framework. The product catalyst of this invention provides a recyclable and hence inexpensive catalyst which coincidently avoids the problem of the undesirable residue. The catalysts of the present invention are termed di- or triphenylated cation radical polymers. They are air stable, dark colored polymers which can be stored indefinitely, are conveniently recovered from the reaction product by simple filtration, and can be readily recharged for recycle. Furthermore, these catalysts, both the polymer supported and unsupported, have been shown to generate with increased yield and efficiency a variety of organic cation radicals, many of which were previously unknown, such as those organic molecules synthesized via the cation radical catalyzed Diels-Alder reaction mechanisms.

The Diels-Alder reaction is one of the most useful synthetic reactions in organic chemistry. The diversity of molecular complexity available through such reactions exceeds that of most other organic reactions. This arises in part from the creation of two new carbon-carbon bonds formed in the end product. In the Diels-Alder reaction, two components (one called a diene and the other termed a dienophile) are combined to form a cyclic compound. The simplest example is the reaction between butadiene with ethene to yield cyclohexene. This reaction requires rather high temperatures and characteristically provides poor yields.

The conventional (uncatalyzed) Diels-Alder reaction, though versatile, has several noteworthy limitations [see for example, Sauer, *J. Angew. Chem. Internat. Edit.* 6:16-33 (1967)]. Perhaps most important is the extremely low reactivity of approximately neutral and electron rich dienophiles. Although Lewis acid catalysts can accelerate certain Diels-Alder reactions, apparantly by increasing the electrophilicity of the dienophile, the strategy seems to succeed only with electron deficient, oxygen containing, dienophiles. One of the guiding premises of the work underlying the present invention was that the electron rich class of dienophiles is just the one which is most subject to ionization and that the resulting cation radicals, being electron deficient, might be activated "dienophiles". The scope of the cation radical catalyzed Diels-Alder reaction would therefore complement that of the conventional Diels-Alder reaction.

The cation radical catalyzed Diels-Alder reaction involves the generation of a cation radical organic molecule using polymer supported or unsupported di- or triphenylated cation radical salts and subsequent reaction of the new cation radical with a neutral organic molecule. The sole recorded precedent for such a reaction seems to be the report [Penner et al, *J. Amer. Chem. Soc.* 92:2861 (1970)] that radiolysis of 1,3-cyclohexadiene yields both the Diels-Alder and photo dimers, presumably via pathways involving diene cation radicals [Barton et al, *J. Chem. Soc. Perkin Trans.* I:2055 (1975)]. A somewhat looser, but still encouraging precedent is the apparent cation radical catalyzed addition of oxygen to dienes. The [2+2] dimerization of N-vinylcarbozole to give a cyclobutane product is the sole additional published example [Ledwith, A. *Accts. Chem. Res.* 5:133 (1972)] of a likely cation radical pericyclic process of which the applicants are aware.

The cation radical Diels-Alder reactions implementing the di- or triphenyl Group VA element cation radical and substituted polymers thereof of the instant invention possess significant utility in the synthesis of biologically relevant substances including compounds of the terpenoid, steroid, and alkaloid series.

SUMMARY OF THE INVENTION

This invention provides a polymer supported di- or triphenylated Group VA element cation radical salt and methods for making the same. Generally, in accordance with the invention a polymer substrate having reactive groups thereon is provided as a support for covalently bound cation radical monomers. The monomers are para substituted or unsubstituted di- or triphenylated cation radical salts of Lewis acids, wherein the cation radical is selected from an element of Group VA of the periodic table, namely nitrogen, phosphorus, arsenic, antimony and bismuth. A preferred composition of the invention is polystyrene supported triphenylaminium cation radical hexachloroantimonate.

Further, in accordance with the methods of this invention, a cation radical catalyzed Diels-Alder synthetic reaction is disclosed. The Diels-Alder synthesis envisions a rapid and convenient reaction between a diene and dienophile to form a significant yield of cyclohexene adduct.

DETAILED DESCRIPTION OF THE PREFERRED EMBODIMENTS

Figure 1:
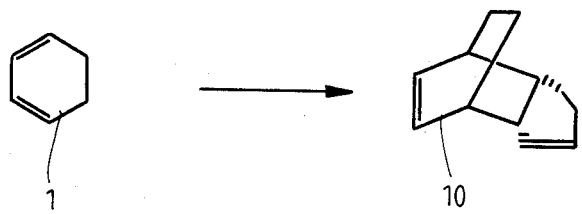

The invention will be described in terms of preferred embodiments which represent the best mode known to the applicants at the time of this application.

Preparation of Di- or Triphenylated Aminium Cation Radical Polymers

As noted above, a complex of a di- or triphenylated cation radical salt covalently bound to a polymeric substrate is employed as a cation radical Diels-Alder reaction catalyst. The di- and triphenylated cation radical polymer catalysts are prepared in the following manner.

In the first stage, a suitable polymer substrate is provided. Particularly suitable polymers for use in the invention are polystyrene polymers, because of the ease of introducing different chemical functional groups onto the backbone of the polymer, i.e. pendant groups. For example, a polystyrene polymer, cross-linked to a desired extent with divinylbenzenene, can be chloromethylated. The chloromethyl groups provide reactive functional groups for subsequent covalent attachment of di- or triphenyl monomers. A typical polystyrene polymer particularly preferred is XAD-4 obtained from Rohm and Haas Co. of Philadelphia, Pa. The commercially available bulk polymer can then be chloromethylated by procedures well known in the art.

Other polymers suitable for substrates of the present invention include both organic and inorganic polymers such as cellulosic polymers, poly(isoprene), nylon, poly(vinyl chloride), poly(ethylene), poly(propylene), fluorocarbon resins, poly(urethane), acrylate resins, polyesters, and rayon. The list is not intended to be exhaustive of the various polymers useful for substrates of the present invention, but as illustrative of the varied substrate availability and applicability.

In addition to the wide variety of polymer substrates that may be used, the form of the substrate may be varied to include for example, powders, beads, blocks, fibers, spheres, filaments, etc. The use of polymers in the form of beads has been found to be advantageous, since the triphenylated monomer may be incorporated onto the beads quite easily by simply stirring a mixture thereof in a suitable organic solvent in the presence of a acid catalyst. Polymeric beads having a size of about 1 to 10 mm can suitably be employed, although beads having a larger size are also amenable in the preparation of the catalysts of this invention. Generally, however, the smaller beads or finely divided powdered material is preferred so as to maximize the surface area available for monomer incorporation, but not so small or fine as to make it difficult to separate the triphenylated polymer catalyst from the reaction media.

Further, in accordance with the present invention, a di- or triphenylated derivative of an element selected from Group VA of the periodic table, namely nitrogen, phosphorus, arsenic, antimony and bismuth is provided. Such components have a general formula of the following structure:

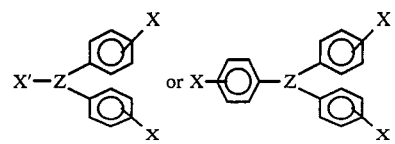

wherein Z represents an element selected from Group VA of the periodic table, suitably Z is nitrogen, phosphorus or arsenic, and preferably Z is nitrogen; X represents a paraphenyl substituent which can be a neutral substituent H, $CH_3$ or equivalents thereof, or can be an electronegative group such as a halogen, carbonyl, hydroxy, alkyl halide, nitrile or nitro group; and X', in the case of diphenylated monomers, is an electronegative group. Preferably, X and X' are halogens selected from fluorine, chlorine, bromine or iodine. Other representative examples of X and X' include —H, —$CF_3$, —OH, —$CH_2Cl$, —$NO_2$, —CN,

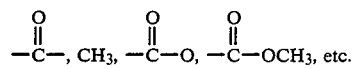

While the para position substitution with X is believed to impost enhanced activity of the resultant catalyst, substitution of positions other to or in addition to the para position is admitted by this invention. It does not appear, however, that substitution at positions in addition to the para position significantly alters the activity of the resultant catalyst, whereas substitutions at positions other than the para position often results in a catalyst of lower activity.

An amount of the polymer substrate and an excess of the monomer, di- or triphenylated Group VA element, are stirred together in a polar reaction media such as dichloromethane. Further included in the reaction media is a Lewis acid metal halide catalyst compound such as $AlCl_3$, $ZnCl_2$, or $FeCl_3$. It is preferred that the catalyst be present in stoichiometric concentrations; that is, concentrations approaching the concentration of monomer present, rather than catalytic concentrations which are often insignificant compared to the other component concentration.

While it is not necessary to have highly elevated temperatures in order that the methods of this invention may satisfactorily proceed, some reduction of the reaction temperature from room temperature may be desirable. Applicants have found that temperature of about 0° C. is particularly advantageous to facilitate substitution of the phenylated Group VA element onto the polymer substrate.

The di- or triphenylated element of Group VA is covalently bound to the polymer through a para or other position of one or more of the phenyl groups via a linkage extended by the polymer such as

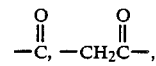

or $(CH_2)_{x-}$; in the case of diphenylated reactants the polymer linkage can also be with Z directly.

Next, the substituted polymer is contacted with a Lewis acid such as $SbCl_5$, $SbF_5$, $AlCl_3$, $BF_3$, $HIO_4$, $HClO_4$, or $FeCl_3$, these compounds are efficient in one electron oxidation of the free two electron component presented by the Group VA element, thereby forming a cation radical. The resulting products have the following general structure:

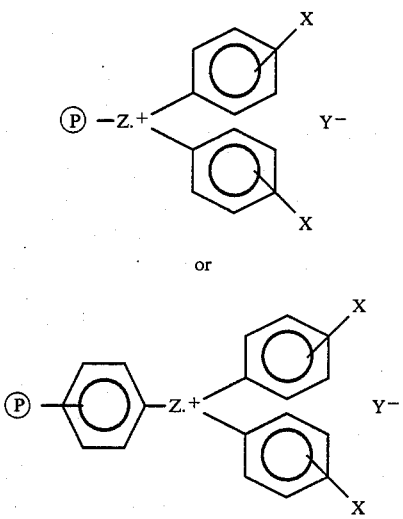

wherein ⓟ is the polymer substrate; Z.+ represents a cation radical of a Group VA element; X is a neutral hydrogen or lower alkyl or electronegative substituent; and Y⁻ is the associated monovalent ion oxidizing acid complex, such as $SbCl_6^-$, $SbF_6^-$, $AlCl_4^-$, $BF_4^-$, $IO_4^-$, $ClO_4^-$, or $FeCl_4^-$. Although Applicants have found particularly desirable to use Lewis acids as the electron abstraction complex, any complex which serves to one electron oxidize a free two electron component as presented by the Group VA element can be substituted for the Lewis acid to generate a cation radical.

In order that the invention may be more clearly understood, preferred embodiments will be further described in terms of the following examples, which should not be construed to limit the scope of this invention.

EXAMPLE I 5 grams of 1.09 meg Cl/gram Merrifield resin (a product of chloromethylation of polystyrene), 8 grams of triphenylamine and 75 ml of dry benzene (stored over Na) were mixed at 0° C. and immersed in an ice bath. 7 grams of $AlCl_3$ were added to the reaction mixture and the mixture was stirred continuously for three days. The temperature was allowed to reach ambient room temperature as the ice melted.

The contents of the reaction mixture were then placed in 500 ml of ethanol for a first wash. The ethanolic solution was then heated to boil for 3 hours while stirred. The suspension was filtered and the solid retained for a second wash with ethanol. The solid recovered from the second wash was then placed in ether for one-half hour wash, this was repeated twice. This same procedure was repeated using $CH_2Cl_2$ as well.

The recovered inactive triphenylamine polymer was then dried overnight in a drying oven set at 80° C. The resultant yield of dried product was 5.6 grams.

Activation of the triphenylamine polymer was accomplished by suspending 12.3 grams of unactivated triphenylamine polymer in a 150 ml of dry $CH_2Cl_2$. The suspension was cooled to 0° C. In an addition funnel, 25 ml of $SbCl_5$ were dissolved in 50 ml of dry $CH_2Cl_2$. This solution was added dropwise to the polymer suspension over a period of about 25 minutes. The suspension immediately turned black upon addition of $SbCl_5$. After the addition was completed, the reaction mixture was stirred for another 15 minutes at 0° C.

The solid was filtered and washed with a continuous flow of about 100.0 ml of $CH_2Cl_2$ until the filtrate was colorless. The black polymer was then dried overnight in a vacuum oven at 80° C. A yield of 18.0 grams of triphenylaminium cation radical hexachloroantimonate substituted polymer was obtained.

EXAMPLE II

Sixty grams of tetrahydrofuran and 11.2 grams of diphenylamine were placed in a 200 ml round bottomed flash equipped with a dropping funnel. The mixture was cooled to −70° C. 20 ml butyllithium was syringed dropwise over ten minutes into the dropping funnel through a rubber septum. The resulting mixture was stirred 45 minutes at −70° C., then allowed to warm to ambient room temperature. 2 grams of 2.63 meg Cl/gram chloromethylated polystyrene polymer were added to the solution.

The dropping funnel was replaced by a reflux condenser. The solution was then brought to reflux. After 60 minutes the mixture was quenched in 200 ml methanol while stirring for 30 minutes. The polymer was washed with 100 ml $CH_2Cl_2$ then 100 ml hexane. 100 ml of sodium methoxide/methanol (0.1M) was prepared and the polymer was stirred in it for one hour to remove aminium chloride salts. The polymer was washed again with 100 ml $CH_2Cl_2$, then dried. The polymer product recovered weighed 2.6 grams.

Next the diphenylamine substituted polymer was gradually stirred into 100 ml $CH_2Cl_2$ at ambient room temperature. A total of 2 ml $Br_2$ dissolved in $CH_2Cl_2$ was dripped into the polymer solution via a buret. The added $Br_2$ imparted a red-orange color to the solution which was evident over several minutes. The solution was covered and allowed to stand overnight to complete the bromination reaction. 3.23 gram dry weight of brominated diphenylamine polymer was recovered from the solution after evaporation of the $CH_2Cl_2$ solvent.

Activation of the diphenylamine polymer was accomplished by first cooling to 0° C. a mixture of 0.5 grams of the substituted polymer in 30 ml dry $CH_2Cl_2$. Next 2 equivalents of $SbCl_5$ (1.05 grams, 0.45 ml) were added dropwise over 10 minutes by syringe into the flash containing the polymer solution; the solution was stirred one hour. The resulting black polymer was filtered from the solution and washed with 50 ml $CH_2Cl_2$. 0.79 gram of brominated diphenylaminium cation radical hexachloroantimonate substituted chloromethylated polymer was recovered.

Chemical Synthesis Processes Utilizing Polymer Supported and Unsupported Di- or Triphenylated Cation Radical Salts The compositions of this invention are useful as cation radical Diels-Alder catalysts. These cation radical catalyzed reactions furnish products many of which were not previously available at all and others at greatly increased yield. The cation radical Diels-Alder reaction is considered to encompass all one electron oxidizing reactions of s-cis dienes with a two electron component, in which the product contains a cyclohexene type ring. Such reactions include polymerizations; biomimetic cation radical squalene cyclization, dipolar cycloadditions; Cope rearrangement; pericyclic reactions; and other selective one electron oxidizing processes.

The polymer supported and unsupported di- and triphenylated cation radical salts of this invention provide significant rate acceleration and yield improvement in many Diels-Alder reactions and effectively extend the scope of the reaction to molecules heretofore too unreactive to participate efficiently in the reaction. For example, with the present catalysts many reactions which heretofore had required days of reaction time to yield significant products are now accomplished in a matter of a few hours and temperatures ranging from −78° C. to 0° C. Furthermore, the reactions catalyzed by the present polymer supported catalysts are highly stereospecific and stereoselective. Consequently, the present catalysts are envisioned as ideal catalytic systems for the direct efficient synthesis of many intricate biologically important substances, including steroids, terpenes, alkaloids, and prostaglandinoids.

For example, 1,3-cyclohexadiene is well known to dimerize via a Diels-Alder reaction, but the reaction requires heating to temperatures around 200° C. for 20 hours in a sealed tube, with a resultant yield in the range of 30% of the product adduct represented in FIG. 1.

In accordance with the methods of this invention implementing cation radical catalysts for the Diels-Alder reaction, when 1,3-cyclohexadiene was exposed to catalytic quantities (5-10 mole %) of the polymer supported or unsupported stable cation radical salt, triphenyl aminium hexachloroantimonate in methylene chloride solution of 0° C., Diels-Alder type dimerization occurred within 15 minutes with a 70% yield. No other dimers such as the photodimer or other relatively volatile products were present. The only side reaction appeared to be polymerization of the diene. Furthermore, the reaction can be rapidly carried out at mild conditions involving temperatures ranging from −78° C. to ambient without appreciable loss of efficiency.

The endo selectivity in the cation radical reaction, 5:1, endo:exo, was quite similar to that observed for the uncatalyzed Diels-Alder, 4:1; endo:exo.

Figure 2:
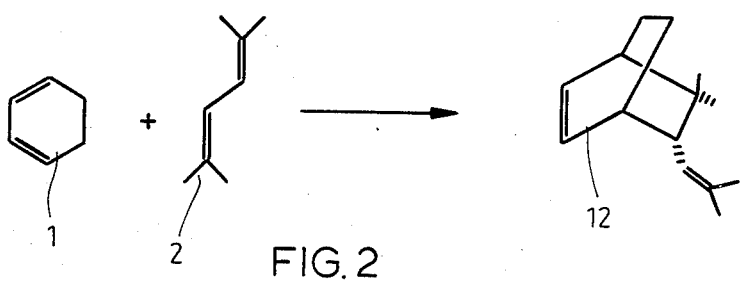

A second limitation of the uncatalyzed Diels-Alder reaction is its pronounced sensitivity to steric effects, present either on the diene or the dienophile. As an illustration of the kinetic impetus of the cation radical Diels-Alder and of the correspondingly expanded scope of this reaction, the subjection of equimolar quantities of 1,3-cyclohexadiene and the sterically hindered dienophile 2,5-dimethyl-2,4-hexadiene to the cation radical triphenylaminium hexachloroantimonate afforded a 40% yield of the Diels-Alder adduct product illustrated in FIG. 2 as an endo:exo pair (4:3). Note that a quanternary carbon at $C_5$ is installed with relative ease. The workup in the cation radical Diels-Alder consists simply of quenching the reaction mixture with water and separating, drying and evaporating the organic phase.

Figure 3:
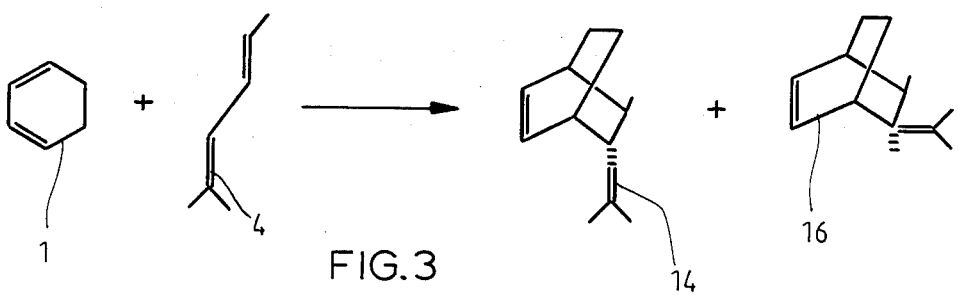

The chemoselectivity of the cation radical Diels-Alder is also of considerable interest. One such reaction is depicted in FIG. 3. The reaction of 1,3-cyclohexadiene 1 with trans-2-methanyl-2,4-hexadiene 4 under cation radical conditions yields adducts 14 and 16 in 40% yield. The exo isomer 16 is the predominant stereoisomer formed. Example III summarizes the operable reaction conditions employed for the chemoselection reaction.

EXAMPLE III 0.5 gram of each diene, 1,3-cyclohexadiene and trans-2-methyl-2,4-hexadiene, was mixed in 15 ml of $CH_2Cl_2$ at 0° C. 3 grams of the cation radical catalyst, chromomethylated polystyrene supported triphenyl aminium hexachloroantimonate prepared according to Example I was added to the reaction mixture. The reaction was allowed to proceed for one hour. A yellow oil was recovered after quenching the reaction with water. Gas chromatographic analysis demonstrated the olefinic compounds 14 and 16, with 16 being the predominantly formed adduct.

EXAMPLE IV

Figure 4:
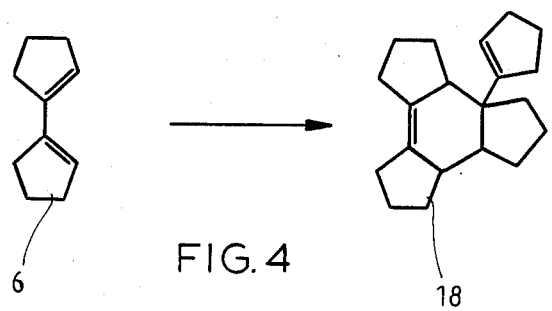

Referring now to FIG. 4, 2 grams of 1,1-dicyclopentene 6 was stirred into 15 ml $CH_2Cl_2$ at 0° C. 0.5 gram of polymer supported cation radical catalyst of Example I was added to the reaction mixture. The reaction was allowed to proceed for 15 minutes. A red solution resulted. The reaction mixture was filtered and the supernatant added to 100 ml of methanol containing two NaOH pellets. The red color changed to yellow. After ten minutes of stirring, the solution was extracted with water to remove the methanol and inorganic substituents. The organic layer was dried over $MgSO_4$. After roto evaporation the brown oil was purified by preparatory gas chromatograph, 5% SE30 5' column at 200° C. Analysis showed the primary product to be compound 18.

EXAMPLE V

Example IV was repeated, however unsupported triphenylaminium hexachloroantimonate was employed in place of the polymer supported catalyst. The product represented in FIG. 4 as compound 18 resulted.

EXAMPLE VI

The spent catalyst can be recovered and recharged for further use. The spent catalyst present in the solid residue filtered from the reaction solution of Example IV was washed several times with $CH_2Cl_2$, then allowed to stir in $CH_2Cl_2$ for 4 hours. Following this rinse procedure, the solvent was filtered and the recovered solid was washed twice again with $CH_2Cl_2$. The four hour stir rinse was also repeated. A dark gray solid was recovered and dried in a vacuum oven at 80° C. for 36 hours. 14.2 grams of spent catalyst residue was recovered.

The solid was then suspended in 100 ml of $CH_2Cl_2$ with cooling to 0° C. Via an addition funnel 15 ml of $SbCl_5$ in 20 ml $CH_2Cl$ was added over one-half hour. The reacted solid was collected by suction filtration and washed five times with 150 ml $Ch_2Cl_2$. After drying in the vacuum oven at 80° C for 24 hours, 18 gram polymer supported triphenylaminium cation radical hexachloroantimonate was recovered.

While the compositions and methods of this invention have been described in terms of preferred embodiments, it will be apparent to those of skill in the art that various changes may be made in the methods and catalysts disclosed without departing from the scope of the invention, which is defined by the following claims.

What is claimed is:

1. A catalyst composition comprising an insoluble, solid polymer substrate having covalently attached thereon a plurality of diphenylated cation radical units of the formula:

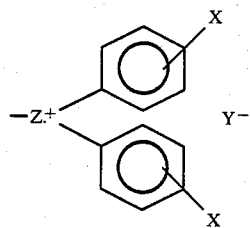

wherein

Z+ represents a monovalent cation radical selected from the group consisting of nitrogen, phosphorus, arsenic, antimony, and bismuth;

each X independently represents hydrogen or a substituted functional group selected from the group consisting of lower alkyl, halogen, hydroxy, alkyl halide, carbonyl, cyano, nitrile, and nitro groups; and Y− represents a monovalent anion;

said diphenylated cation radical covalently attached through one or more of its phenyl groups to the polymer substrate.

2. The composition of claim 1 wherein Z.+ is a nitrogen, phosphorus or arsenic cation radical.

3. The composition of claim 1 wherein Z.+ is a nitrogen cation radical.

4. The composition of claim 1 wherein X is a halogen or hydrogen.

5. The composition of claim 1 wherein Y− is selected from the group consisting of perchlorate anion and monovalent anion halide salts of antimony, aluminum, boron or iron.

6. The composition of claim 1 wherein Y− is a monovalent anion halide salt of antimony.

7. The catalyst composition of claim 1 wherein the polymer support is cellulose, polyisoprene, nylon, rayon, polyvinylchloride, polyethylene, polypropylene, fluorocarbon resin, polystyrene, polyurethane, polyester or acrylate resin.

8. The catalyst composition of claim 1 wherein the polymer support is a polystyrene.

9. The catalyst composition of claim 1 wherein the functional group X is in a para position relative to Z.+.

* * * * *